United States Patent
Uehara (10) Patent No.: US 7,382,764 B2
(45) Date of Patent: Jun. 3, 2008

(54) METHOD OF CONTROLLING A RECEIVING OPERATION

(75) Inventor: Teruaki Uehara, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 243 days.

(21) Appl. No.: 11/055,590

(22) Filed: Feb. 11, 2005

(65) Prior Publication Data

US 2005/0226204 A1   Oct. 13, 2005

(30) Foreign Application Priority Data

Apr. 9, 2004   (JP)   .............................. 2004-115312

(51) Int. Cl.
*H04J 3/24* (2006.01)
(52) U.S. Cl. ...................... 370/349; 370/392; 370/338; 455/240.1
(58) Field of Classification Search ................ 370/252, 370/337, 320, 394, 474, 389, 465, 466, 400, 370/349, 392, 328, 338, 351, 352, 401; 455/507, 455/515, 232.1, 234.1, 240.1, 250.1
See application file for complete search history.

(56) References Cited

U.S. PATENT DOCUMENTS

| 6,256,509 | B1 * | 7/2001 | Tanaka et al. .............. 455/515 |
| 6,876,631 | B2 * | 4/2005 | Suzuki et al. ............... 370/252 |
| 6,909,702 | B2 * | 6/2005 | Leung et al. ............... 370/278 |
| 6,985,459 | B2 * | 1/2006 | Dickson ..................... 370/328 |
| 7,031,666 | B2 * | 4/2006 | Hsu ............................ 455/72 |
| 2002/0090959 | A1 * | 7/2002 | Laroia et al. ............... 455/458 |
| 2002/0098840 | A1 * | 7/2002 | Hanson et al. ............. 455/435 |
| 2004/0059825 | A1 * | 3/2004 | Edwards et al. ............ 709/230 |
| 2004/0179536 | A1 * | 9/2004 | Thubert et al. ......... 370/395.52 |
| 2006/0072614 | A1 * | 4/2006 | Ogiso et al. ............... 370/474 |

FOREIGN PATENT DOCUMENTS

| JP | 8195754 | 7/1996 |
| JP | 2003299141 | 10/2003 |

* cited by examiner

*Primary Examiner*—Edward F. Urban
*Assistant Examiner*—Nhan T. Le
(74) *Attorney, Agent, or Firm*—Volentine & Whitt, P.L.L.C.

(57) ABSTRACT

A method of controlling a receiving operation includes, receiving a transmission frame into a wireless device, and decoding the transmission frame. A header information in the transmission frame is analyzed. Then, the receiving operation is suspended in response to the header information.

4 Claims, 8 Drawing Sheets

| TYPE | EXTRACTED DESTINATION ADDRESS | FCS | REAL DESTINATION ADDRESS |
|---|---|---|---|
| 1 | TARGET STATION | TRUE | TARGET STATION |
| 2 | TARGET STATION | ERROR | NO RELATIONSHIP |
| 3 | ANOTHER STATION | TRUE | NO RELATIONSHIP |
| 4 | ANOTHER STATION | ERROR | NO RELATIONSHIP |

METHOD OF CONTROLLING A RECEIVING OPERATION

CROSS REFERENCE TO RELATED APPLICATION

A claim of priority under 35 U.S.C. §119 is made to Japanese Patent Application No. 2004-115312, filed Apr. 9, 2004, which is herein incorporated by reference in its entirety for all purposes.

BACKGROUND OF THE INVENTION

1. Field of the Invention

The present invention relates to a method of controlling a receiving operation which is used for wireless LAN(Local Area Network).

2. Description of the Related Art

Wireless LAN terminals are increasingly a part of modern life. The wireless LAN terminals do not need a network cable. Therefore, in the wireless LAN terminal which is driven by a battery, the terminal can be used as a mobile device in a communication area. For making a communication between the wireless LAN terminals and an accessing point, CSMA/CA(Carrier Sense Multiple Access with Collision Avoidance) is used as a wireless LAN standard. The CSMA/CA is used by a 2.4-GHz band wireless LAN standard such as an IEEE(Institute of Electrical and Electrical Engineers) 802.11b standard and an IEEE 802.11g standard.

A maximum transmission speed of the IEEE 802.11g is 54-Mbps and a maximum transmission speed of the IEEE 802.11b is 11-Mbps. The IEEE 802.11g has an upward compatibility to the IEEE 802.11b. Therefore, a device which uses the IEEE 802.11g can communicate to a device which uses the IEEE 802.11g and the IEEE 802.11b. Both of the IEEE 802.11b and the IEEE 802.11g adopt DSSS(Direct Sequence Spread Spectrum) and OFDM(orthogonal frequency division multiplexing). A synchronizing portion and a header portion of a transmission frame are modulated by a DBPSK of 1 Mbps mode or a QPSK of 2 Mbps mode for making the compatibility of these standards. The IEEE 802.11b and an IEEE 802.11a are described in reference 1: Japanese Patent Laid-Open No. 2003-299141.

In the mobile terminal of the wireless LAN system, low power consumption is desired. A technique for achieving the low power consumption is described in reference 2: Japanese Patent Laid-Open 8-195754. In reference 2, a standby period is extended by receiving a beacon signal for reducing the power consumption during waiting time. The mobile terminal may be called a mobile station or simply called a wireless LAN station in this invention.

The beacon signal is transmitted from the access point every 100 msec. Therefore, the mobile station which has a power saving mode can be changed between an awake mode and a doze mode in response to the beacon signal from an access point. The access point changes the condition of the mobile station to the awake mode or the doze mode by checking whether the mobile station is in a power consumption mode or not. An information which indicates an interval of the transmitting operation of the beacon signal is included in a frame body which is next to a MAC header portion.

In the wireless LAN station, further low power consumption has been desired. In particular, the device which is driven by a battery desires the low power consumption. In the CSMA/CA, the mobile station receives carriers continually for checking a data sending timing. Therefore, it is difficult to reduce the power consumption in such device.

For example, when the access point and one mobile station communicate using the IEEE 802.11b, and the other mobile station which uses the IEEE 802.11b and a mobile station which uses the IEEE 802.11g are located in the same communication area, a radio wave of the IEEE 802.11b is transferred to each station in the communication area. The station of the IEEE 802.11g waiting to send a signal may wait until the communication which is performed by the IEEE 802.11b is completed. Therefore, the station which uses the IEEE 802.11g and is waiting to send the signal, consumes powers receiving the unneeded signal.

Also, when a plurality of mobile stations which use the IEEE 801.11g make a communication link to the access point, the stations waiting to send the signal may wait while receiving the unneeded signal until the communication by the other station is completed. Therefore, it is difficult to reduce power consumption.

SUMMARY OF THE INVENTION

Accordingly, in one aspect of the present invention, a method of controlling a receiving operation for achieving low power consumption is provided. The method of controlling a receiving operation includes, receiving a transmission frame into a wireless device, and decoding the transmission frame. A header information in the transmission frame is analyzed. Then, the receiving operation is suspended in response to the header information.

DETAILED DESCRIPTION OF THE PREFERRED EMBODIMENTS

A method of controlling a receiving operation according to preferred embodiments of the present invention will be explained hereinafter with reference to the accompanying figures. In order to simplify the explanation, like elements are given like or corresponding reference numerals. Dual explanations of the same elements are avoided.

Figure 2:
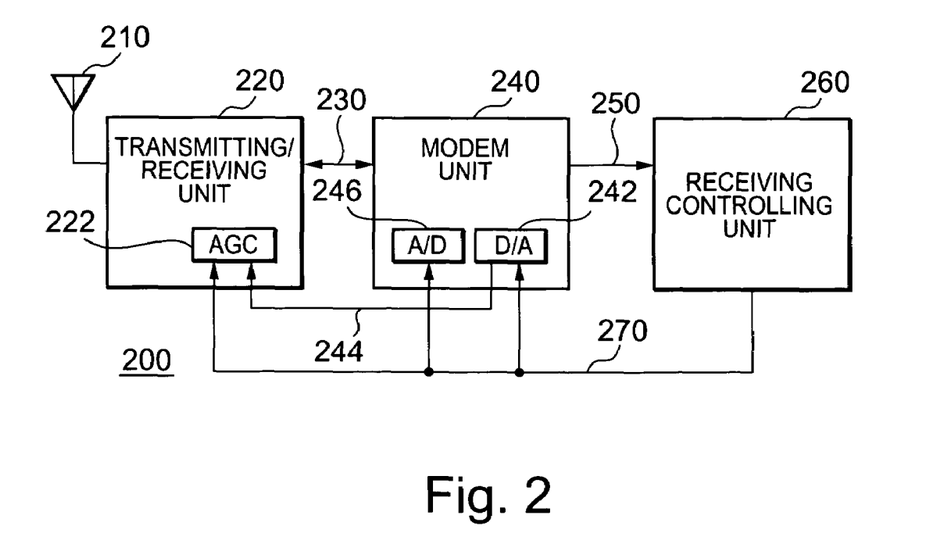
FIG. 2 is a block diagram showing the wireless LAN device of the present invention.

FIG. 2 is a block diagram showing a wireless LAN device 200. The wireless LAN device 200 is compliant with the IEEE 802.11b and the IEEE 802.11g standards. In this embodiment, the wireless LAN device 200 can be operated with low power consumption independently of a beacon signal, while the wireless LAN device 200 makes a communication link to an access point in an infrastructure mode. The wireless LAN device 200 communicate with other wireless LAN devices directly in an ad hoc mode.

Figure 3:
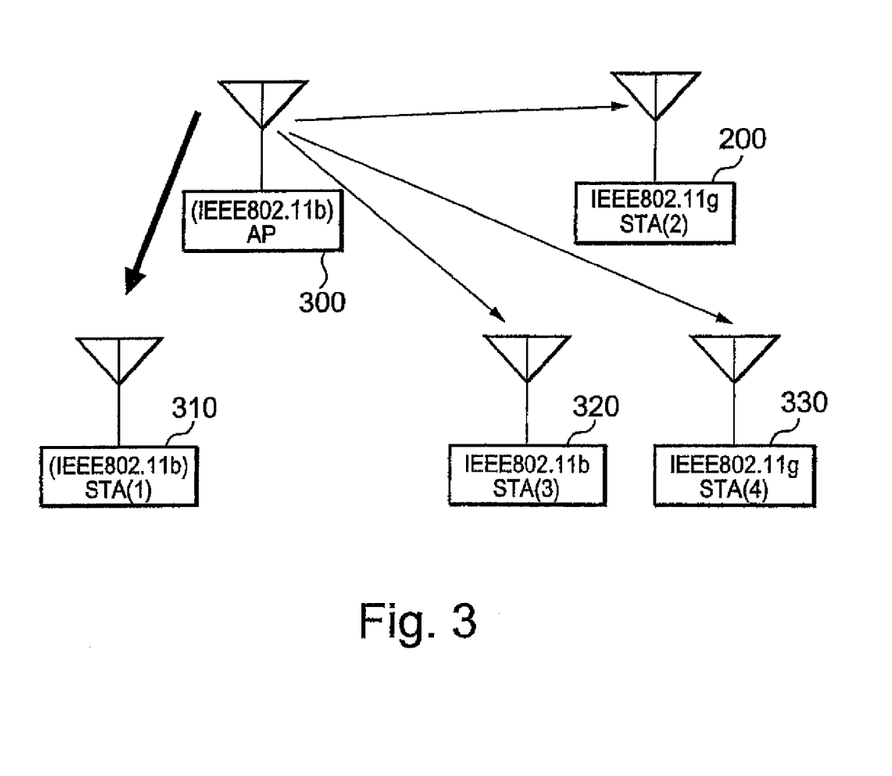
FIG. 3 is a schematic diagram showing a wave receiving condition in the wireless LAN device.

FIG. 3 is a schematic diagram showing a wave receiving condition in the wireless LAN device 200. In FIG. 3, a communication is performed between the access point 300 and the wireless LAN device 310 by the IEEE 802.11b. The wireless LAN devices 200, 320, and 330 receive a carrier from the access point 300.

The wireless LAN device 200 includes an antenna 210, a transmitting/receiving unit 220 which transmits and receives a radio frequency signal, a modem unit 240 which is connected to the transmitting/receiving unit 220 via a connecting line 230, and a receiving controlling unit 260 which is connected to the modem unit 240 via a connecting line 250, as shown in FIG. 2. The modem unit 240 demodulates a receiving signal to a receiving frame and modulates a transmitting frame to a radio frequency signal. The receiving controlling unit 260 is operated for achieving low power consumption operation in response to the receiving frame. The receiving controlling unit 260 outputs a control signal to the transmitting/receiving unit 220 and the modem unit 240 via a connecting line 270.

The transmitting/receiving unit 220 is an RF circuit for transmitting and receiving a 2.4-GHz band wireless signal. The transmitting/receiving unit 220 includes an automatic gain control circuit 222 which amplifies the received signal in response to a level of the received signal. The automatic gain control circuit 222 suspends the amplifying operation in response to the control signal from the receiving controlling unit 260. While the amplifying operation is suspended, the power consumption in the wireless LAN device 200 is reduced. A gain control signal is supplied from a digital analog converter 242 in the modem unit 240 to the automatic gain control circuit 222 via a connecting line 244.

The modem unit 240 includes an analog digital converter 246 which converts an analog received signal to a digital signal. Also, the modem unit 240 has a function for modulating the converted digital signal to a PLCP(Physical Layer Convergence Procedure) frame and a MAC(Media Access Control) frame. The modem unit 240 measures the level of the receiving signal and supplies the gain control signal to the automatic gain control circuit 222 for controlling receiver sensitivity.

Figure 4:
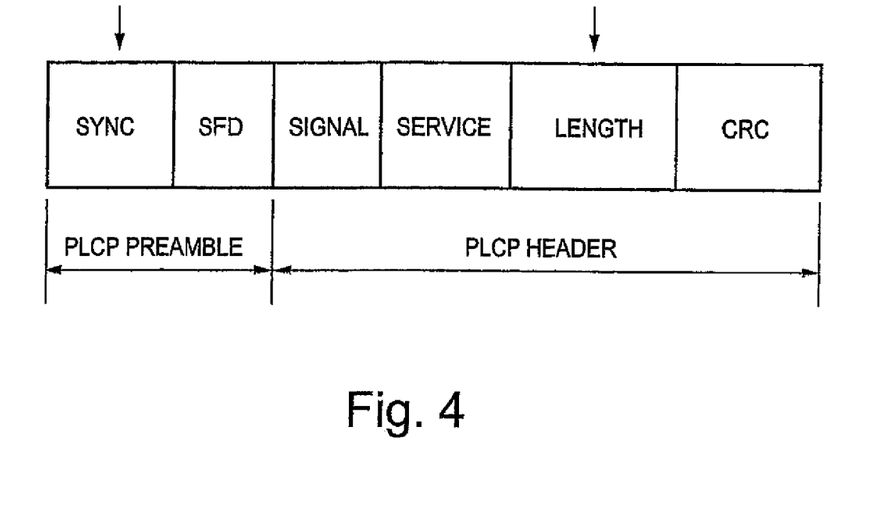
FIG. 4 is a block diagram showing a structure of a header of a PLCP frame.
Figure 5:
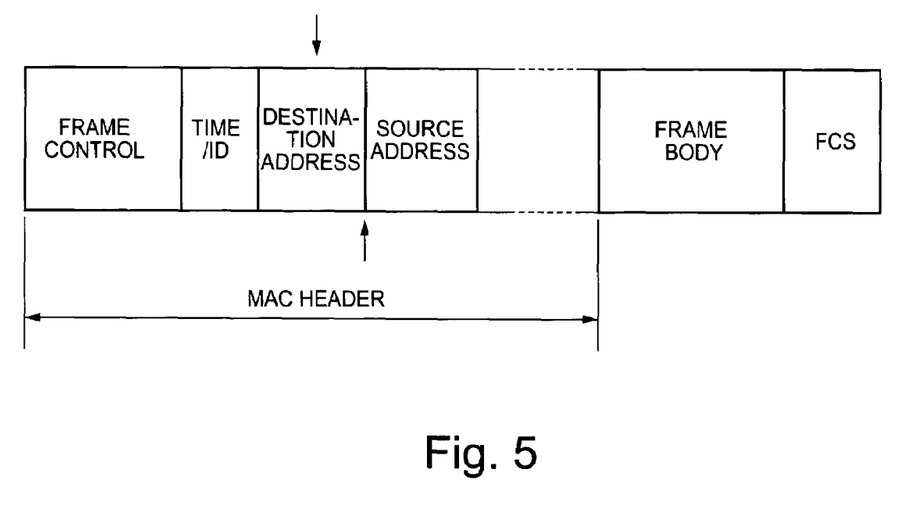
FIG. 5 is a block diagram showing a field of a MAC header, frame body, and an FSC.

A beginning portion of the PLCP frame and the MAC frame are shown in FIG. 4 and FIG. 5. The beginning portion of the PLCP frame includes a PLCP preamble and a PLCP header. The PLCP preamble includes a synchronization signal field SYNC and a starting field SFD. The SYNC field is used for deciding whether the communication type is the IEEE 802.11b or the IEEE 802.11g. The PLCP header includes a SIGNAL field, a SERVICE field, a LENGTH field, and a CRC field. The SIGNAL field shows a transferring speed of the MAC frame. The SERVICE field is used for setting a modulation type. The LENGTH field shows a period of time for transmitting data. The CRC field is used for checking redundancy.

The MAC frame is appended to the PLCP header. The MAC frame includes a MAC header, a frame body, and an FCS frame. The MAC header includes a FRAME CONTROL field, a TIME/ID field, a DESTINATION ADDRESS field, and a SOURCE ADDRESS field. The frame body and the FCS field are appended to the MAC header. A combination of the PLCP frame and the MAC frame is called PPDU(PLCP Protocol Data Unit).

Figure 6:
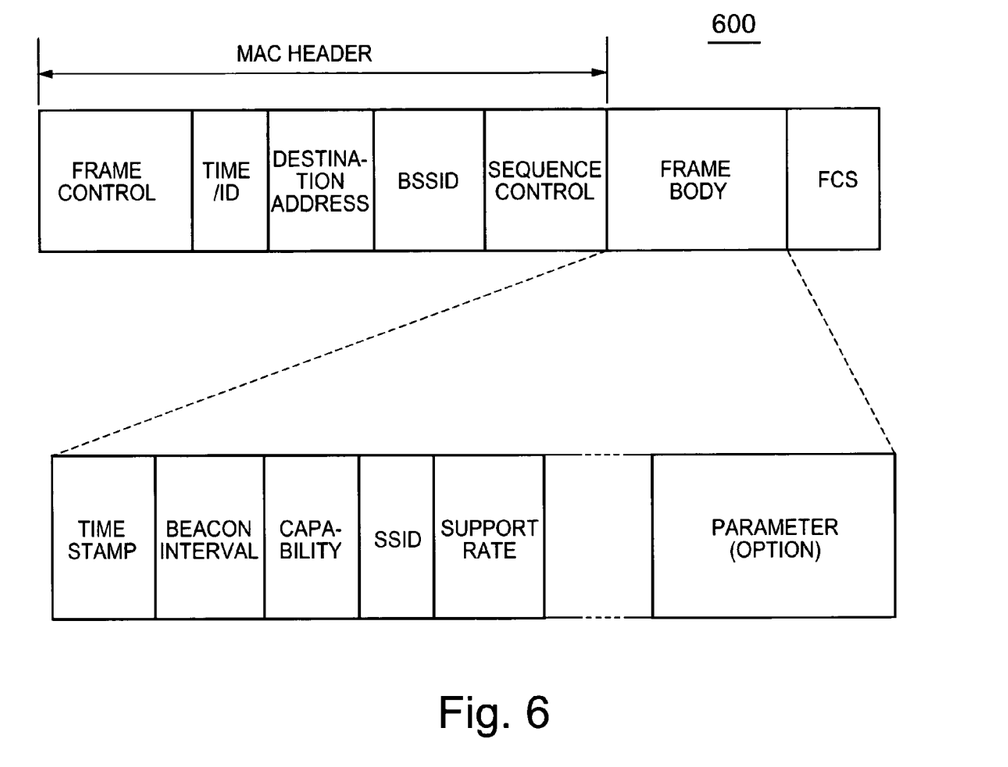
FIG. 6 is a block diagram showing a structure of a beacon frame.

A beacon frame 600 which is transmitted from the access point 300 is described by referring to FIG. 6. The beacon frame 600 includes the MAC header which includes the FRAME CONTROL field, the TIME/ID field, the DESTINATION ADDRESS field, BSSID field, and a SEQUENCE CONTROL field. The frame body includes a TIME STAMP field, a BEACON INTERVAL field, a CAPABILITY INFORMATION field, a SSID field, and a SUPPORT RATE field.

Figure 1:
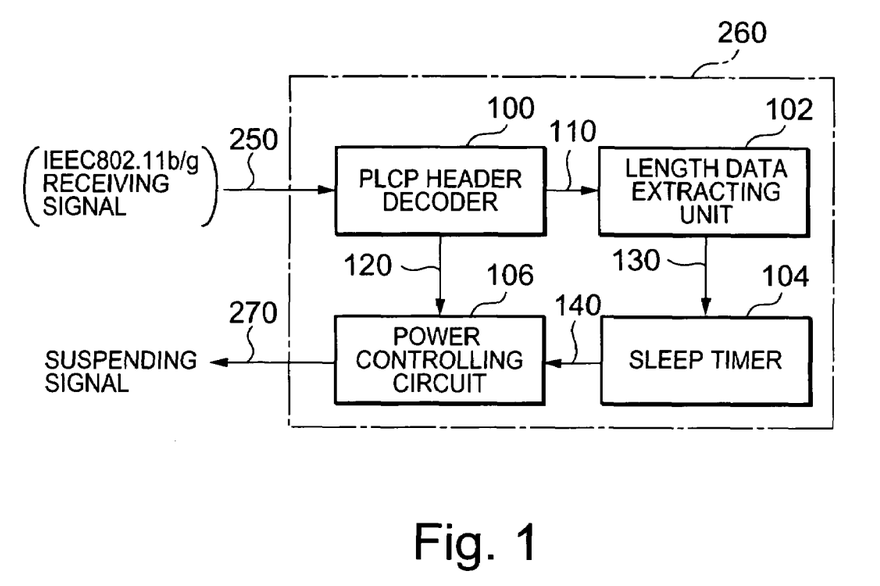
FIG. 1 is a block diagram showing a receiving controlling unit in a wireless LAN device of a present invention.

A structure of the receiving controlling unit 260 is described in FIG. 1. The receiving controlling unit 260 has a PLCP header decoder 100. The PLCP header decoder has input thereto a receiving signal of the IEEE 802.11b or the IEEE 802.11g, and extracts the PLCP preamble and the PLCP header from the receiving signal. The PLCP header decoder 100 checks data validity by using the CRC field. If the data validity is confirmed, the extracted PLCP data 110 is output to a length data extracting circuit 102. If the data validity is not confirmed, the receiving operation is continued. The PLCP header decoder 100 judges the communication type based on the synchronizing signal in the PLCP preamble. If the communication type is different, the PLCP header decoder 100 outputs a judgment information 120 to a power controlling circuit 106.

When the mobile station which is used exclusively for the IEEE 802.11g receives the signal of the IEEE 802.11b, the mobile station sets data which is included in the LENGTH field to a sleep timer 104, and the receiving circuit is suspended during when the set time is counted. Also, when the mobile station which is used exclusively for the IEEE 802.11b receives the signal of the IEEE 802.11g, the mobile station sets data which is included in the LENGTH field to a sleep timer 104, and the receiving circuit is suspended during the set time is counted.

Figure 7:
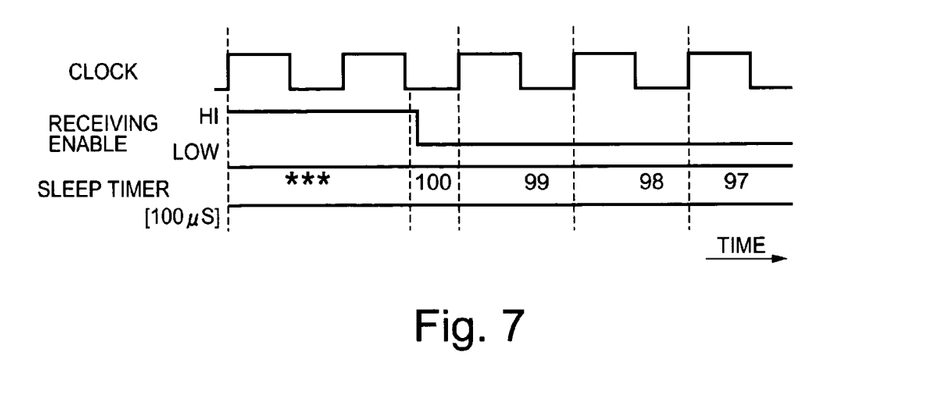
FIG. 7 is a timing chart showing a sleep timer operation.
Figure 8:
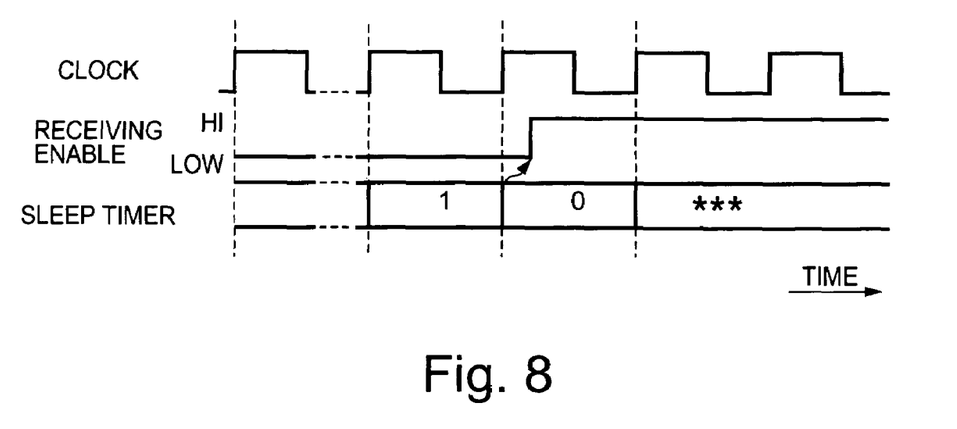
FIG. 8 is a timing chart showing a sleep timer operation.

The length data extracting circuit 102 extracts the length data which shows a length of time of data transmitting from the PLCP frame and sets the extracted data 130 to the sleep timer 104. The time of data transmitting is set in 1 µs units. The sleep timer 104 is operated by a clock of 1 µs units. For example, when the length data 130 which has 100 values is set in the sleep timer 104, the sleep timer 104 outputs a receiving enable signal 140 having a low level while decrementing the set length data in response to the 1 µs cycle clock, as shown in FIG. 7. When the counted value becomes 0 value, the receiving enable signal 140 turns to a high level, as shown in FIG. 8. The sleep timer 104 outputs the receiving enable signal 140 to a power controlling circuit 106.

Figure 9:
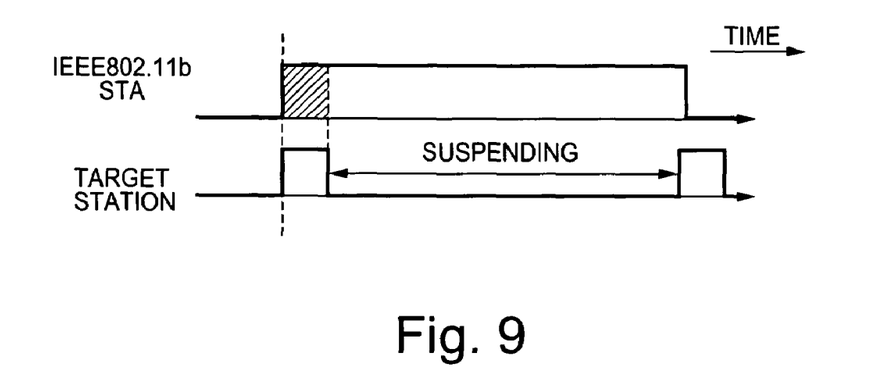
FIG. 9 is a timing chart showing a suspending time in response to the PLCP header.

The power controlling circuit 106 generates a suspending signal 270 in response to the judgment information 120 and the receiving enable signal 140 as shown in FIG. 1. The suspending signal 270 is supplied to the automatic gain controlling circuit 222 and the digital analog converter 242 as shown in FIG. 2. Therefore, during when the suspending signal 270 is output, the receiving circuit is operated in the power saving mode as shown in FIG. 9. The power saving mode is performed by suspending the clock to the automatic gain controlling circuit 222 and the digital analog circuit 242.

Figure 10:
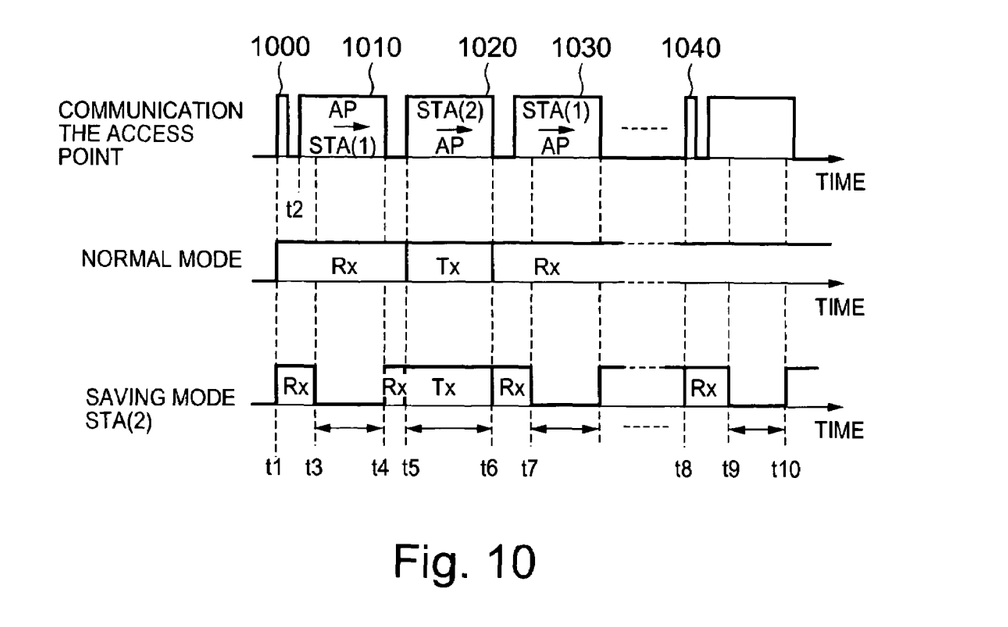
FIG. 10 is a timing chart showing a receiving operation in the wireless LAN device.

Next, a receiving controlling operation of the wireless LAN device 200 is described by referring to FIG. 10. First, a beacon signal 1000 is transmitted from the access point at "t1". Then, the communication to the wireless LAN device STA(1) by the IEEE 802.11b or the IEEE 802.11g is started at "t2". When the wireless LAN device STA(2) receives a transmitting frame 1010 for the wireless LAN device STA (1), the PLCP header decoder 100 in the wireless LAN device STA(2) extracts the PLCP header from the receiving frame. Then, the length data is extracted by the length data extracting circuit 102. The validity of the PLCP header is confirmed by using the CRC. When the PLCP header is valid and the receiving frame has different communication type from the wireless LAN device STA(2), the value of the extracted length data is set to the sleep timer 104 in the wireless LAN device STA(2). Then, the low level of the receiving enable signal 140 is output to the power controlling circuit 106 at "t3". If the PLCP header is invalid, the receiving operation is continued.

The power controlling circuit 106 outputs the suspending signal 270 to the transmitting/receiving unit 220 and the modem unit 240 during the time when the length data is decreased in the sleep timer 104. The transmitting/receiving unit 220 and the modem unit 240 enter a suspend mode in response to the suspending signal 270. Then, the receiving circuit starts working in response to the 0 value of the sleep timer at "t4". Accordingly, the receiving operation is suspended in a period from "t3" to "t4", and the power consumption is reduced in this period.

Then, the wireless LAN device STA(2) transmits a transmitting frame 1020 to the access point AP during a period from "t5" to "t6". In this period, the suspending signal 270 is output to the receiving circuit, and the receiving circuit is suspended. Then, the wireless LAN device STA(2) starts the receiving operation at "t6". When the wireless LAN device STA(2) receives the PLCP header in the transmitting frame 1030 which is sent from the wireless LAN device STA(1) to the access point AP, the receiving operation in the wireless LAN device STA(2) is suspended at "t7". Also, the same operation is performed from "t8" to "t10".

In this embodiment, the judgment that whether the receiving operation can be suspended or not is decided based on the preamble of the PLCP frame. Further, the suspending time is decided by the header of the PLCP frame. As a result, when the wireless LAN device receives the different type of the receiving frame, the wireless LAN device can be suspended during the time which is set by the length data of the PLCP header. Therefore, the low power consumption operation is achieved.

Figure 11:
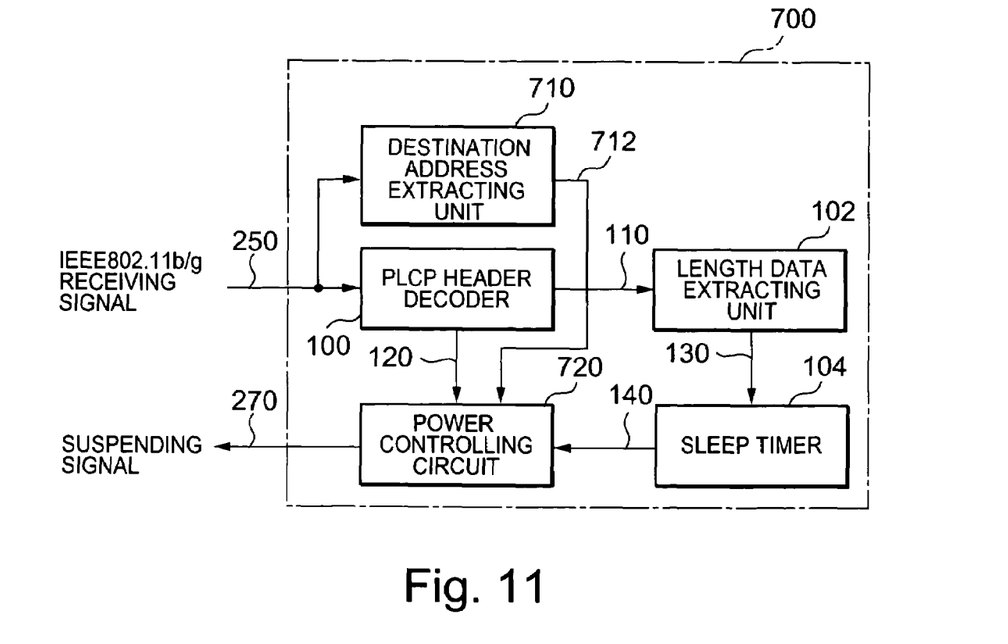
FIG. 11 is a block diagram showing a structure of a receiving controlling unit of another embodiment of the present invention.

Next, another embodiment is described by referring to FIG. 11. A receiving controlling unit 700 includes a destination address extracting circuit 710. The destination address extracting circuit 710 has input thereto the receiving signal 250 and outputs an output signal to the power controlling circuit 720.

The destination address extracting circuit 710 judges whether the receiving frame is sent for the wireless LAN device or not based on data of a DESTINATION ADDRESS field. If the receiving frame is exclusively available for another wireless LAN device, the suspending signal 270 is output from the power controlling circuit 720 based on a detecting signal 712 and the receiving enable signal 140. The suspending time is defined by the LENGTH field in the PLCP header. The transmitting/receiving unit 220 and the receiving circuit in the modem unit 240 are suspended by the suspending signal 270. Also, if the receiving frame is a different communication type, the suspending signal 270 is generated and the receiving circuit is suspended.

Figure 14:
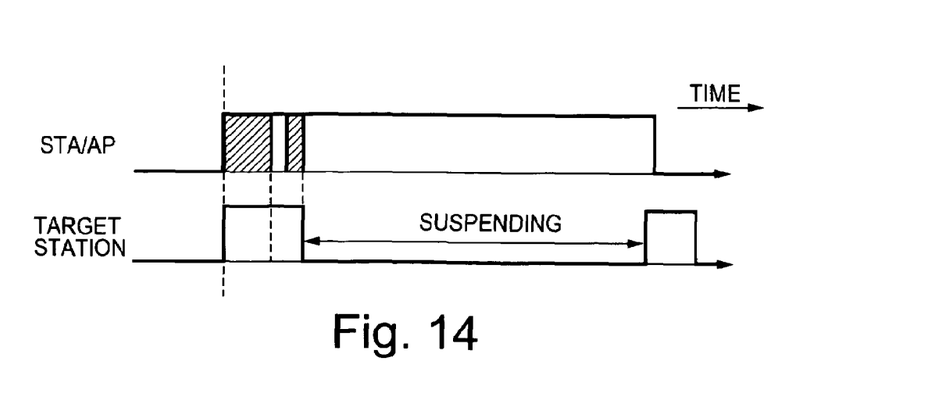
FIG. 14 is a timing chart showing a receiving timing.

In response to the suspending signal, the power or the clock signal for the transmitting/receiving unit 220 and the receiving circuit in the modem unit 240 is suspended as shown in FIG. 14.

Figure 13:
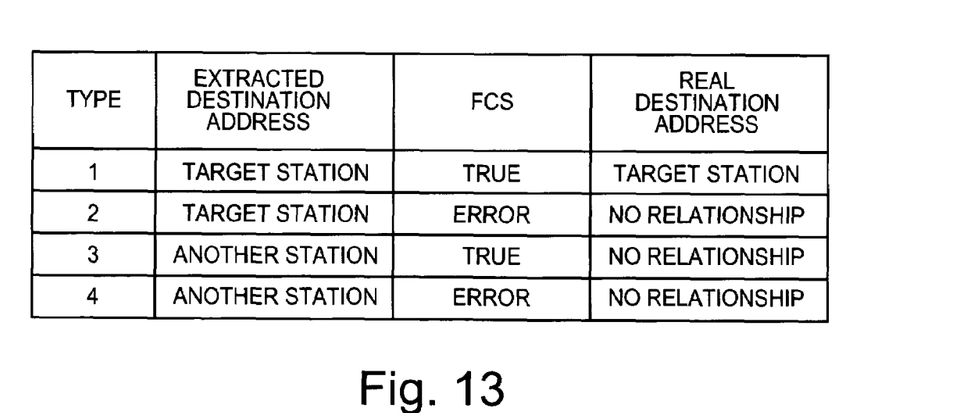
FIG. 13 is a table showing a receiving condition.

Accordingly, since the suspending signal 270 is generated based on the extracted destination address, a timing for starting the low power consumption operation can be accelerated. A judgment table is shown in FIG. 13. If the extracted destination address data which corresponds to the wireless LAN station is received and is judged true by using the FCS, the destination address is truly sent to the targeted wireless LAN station. If the extracted destination address data which corresponds to the wireless LAN station is received and is judged as being in error by using the FCS, the destination address has no relationship to the targeted wireless LAN station. If the extracted destination address data does not correspond to the targeted wireless LAN station, the real destination address has no relationship to the targeted wireless LAN station. That is, if the receiving operation is suspended by using the extracted destination address data without using the FCS, the receiving frame for the targeted wireless LAN station can be received correctly.

Figure 15:
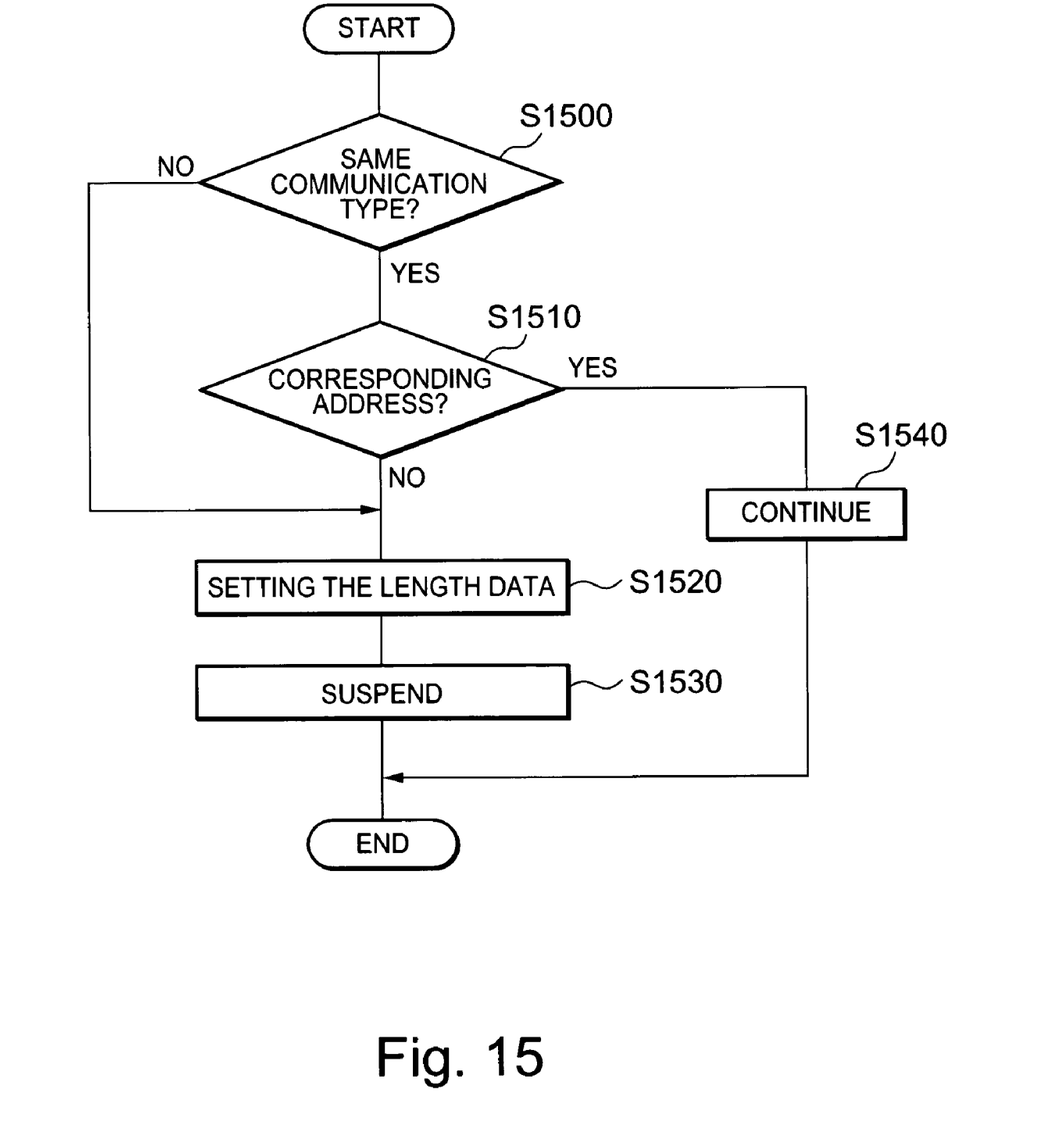
FIG. 15 is flowchart showing a judgment operation in the receiving controlling unit.

The judgment operation in the receiving controlling unit 700 is described by referring to FIG. 15. When the communication signal of the IEEE 802.11b or the IEEE 802.11g is received and the receiving frame of the communication signal is input to the PLCP header decoder 100 and the destination address extracting circuit 710, the PLCP header decoder 100 judges whether the type of the receiving frame signal is available for the wireless LAN device or not at step S1500. If the communication type is the same as the communication type which is used in the wireless LAN device, a step S1510 is applied as the next step. If the communication type is different from the communication type which is used in the wireless LAN device, a step S1520 is applied as the next step.

Further, the transmitting time length in the LENGTH field is received in the step S1520. Also, the validity of the PLCP header is verified by using the CRC field. The LENGTH data 130 is set in the sleep timer 104 after the validity is verified. Then, the low level of the receiving enable signal 140 is output from the sleep timer 104 to the power controlling circuit 720, and countdown is started. If the validity of the PLCP header is not verified, the receiving operation is continued.

Then, the power controlling circuit 720 generates the suspending signal 270 in response to the receiving enable signal 140 and the result of the judgment in the PLCP header decoder 100, and outputs the suspending signal 270 to the transmitting/receiving unit 220 and the modem unit 240. As a result, while the suspending signal 270 is output from the power controlling circuit 720, operating of the automatic gain controlling circuit 222 and the digital analog converter 242 are suspended. The suspending operation can be performed by suspending the clock signal which is input to the automatic gain controlling circuit 222 and the digital analog converter 242.

Figure 12:
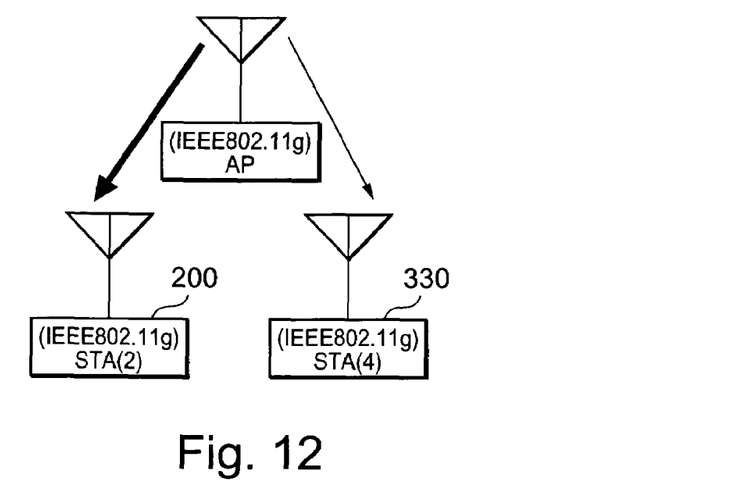
FIG. 12 is a schematic diagram showing a wave receiving condition in the wireless LAN device.

If the communication type is the same as the station as shown in FIG. 12, a step 1510 is applied as the next step. When the MAC header destination address field is received in the step S1510, the destination address is extracted by the destination address extracting circuit 710, and it is judged whether the receiving frame is valid for the station or not. If the receiving frame is not valid for the station, the step S1520 is applied and the LENGTH data 130 is set in the sleep timer 104. The sleep timer 104 outputs the low level of the receiving enable signal 140 to the power controlling circuit 720 in response to setting the LENGTH data 130. Then the suspending operation is performed in the step S1530. When the counting value in the sleep timer 104 becomes "0", the high level of the receiving enable signal 140 is supplied to the power controlling circuit 720. As a result, the power controlling circuit 720 stops outputting the suspending signal 270, and the receiving operation is restarted.

If the receiving frame signal is judged valid for the station, the receiving operation is continued as a step S1540.

In this embodiment, if the receiving frame has the same communication type for the station, the suspending operation can be performed.

While the preferred form of the present invention has been described, it is to be understood that modifications will be apparent to those skilled in the art without departing from the spirit of the invention. The scope of the invention is to be determined solely by the following claims.

What is claimed is:

1. A method of controlling a receiving operation, comprising:
   receiving a transmission frame at a wireless device;
   determining if communication type of the received transmission frame is acceptable for the wireless device;
   extracting length data from the received transmission frame when the communication type is determined as not acceptable for the wireless device;
   suspending a receiving operation of the wireless device for a length of time corresponding to the extracted length data;
   determining if a destination address of the received transmission frame is different than an address of the wireless device; and
   extracting the length data from the received transmission frame when the address of the received transmission frame is determined to be different than the address of the wireless device.

2. A method of controlling a receiving operation, comprising:
   receiving a transmission frame at a wireless device;
   determining if communication type of the received transmission frame is acceptable for the wireless device;
   extracting length data from the received transmission frame when the communication type is determined as not acceptable for the wireless device; and
   suspending a receiving operation of the wireless device for a length of time corresponding to the extracted length data,
   wherein said suspending comprises disabling a clock to an automatic gain control unit and a digital/analog converting unit of the wireless device.

3. A method of controlling a receiving operation in a wireless LAN, comprising:
   receiving a transmission frame at a wireless device;
   determining if a wireless LAN standard of the received transmission frame is compatible with the wireless device;
   extracting length data from the received transmission frame when the wireless LAN standard is determined as not compatible with the wireless device;
   suspending a receiving operation of the wireless device for a length of time corresponding to the extracted length data;
   determining if a destination address of the received transmission frame is different than an address of the wireless device; and
   extracting the length data from the received transmission frame when the address of the received transmission frame is determined to be different than the address of the wireless device.

4. A method of controlling a receiving operation in a wireless LAN, comprising:
   receiving a transmission frame at a wireless device;
   determining if a wireless LAN standard of the received transmission frame is compatible with the wireless device;
   extracting length data from the received transmission frame when the wireless LAN standard is determined as not compatible with the wireless device; and
   suspending a receiving operation of the wireless device for a length of time corresponding to the extracted length data,
   wherein said suspending comprises disabling a clock provided to an automatic gain control unit and a digital/analog converting unit of the wireless device.

* * * * *